United States Patent [19]

Fang et al.

[11]  4,243,504

[45]  Jan. 6, 1981

[54] FLUOROVINYL ETHER POLYMERS

[75] Inventors: James C. Fang, Media, Pa.; Carl G. Krespan, Wilmington, Del.

[73] Assignee: E. I. Du Pont de Nemours and Company, Wilmington, Del.

[21] Appl. No.: 54,240

[22] Filed: Jul. 2, 1979

[51] Int. Cl.³ .................... C25B 13/08; C07C 43/12
[52] U.S. Cl. ................ 204/296; 204/252; 260/456 F; 260/955; 528/44; 528/401; 528/402; 546/236; 546/312; 568/579; 568/615
[58] Field of Search .............. 204/296, 252, 301; 528/44, 401, 402; 260/456 F, 955, 567.6 F; 546/236, 312; 568/579, 615; 526/58

[56] References Cited

U.S. PATENT DOCUMENTS

| | | | |
|---|---|---|---|
| 4,148,982 | 4/1979 | Morozumi et al. | 526/58 |
| 4,154,753 | 5/1979 | Fielding | 260/456 F |
| 4,188,469 | 2/1980 | Fang | 204/296 X |

FOREIGN PATENT DOCUMENTS 2504622  8/1975  Fed. Rep. of Germany .

*Primary Examiner*—Arthur C. Prescott

[57] ABSTRACT

Fluorovinyl ether polymers consisting essentially of 60 to 99.9 mole percent of monomeric units —$CF_2CFY$— and 0.1 to 40 mole percent of the structural units

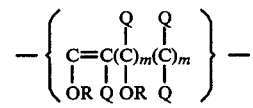

wherein Y is F, H, Cl, Br, $R_f$ or $OR_f$, $R_f$ is perfluoroalkyl, R is alkyl, Q is F or OR, and m is 0 or 1, are prepared by contacting a fluoropolymer of the formula $(CF_2CFY)_x$ wherein at least 1% of the Y's are reactive sites selected from the group consisting of H, Cl and Br, with an alkali or alkaline earth metal alkoxide.

Electrolytic cell diaphragms are prepared by forming the above fluorovinyl ether polymer and fibrous material into a diaphragm, heating the diaphragm thereby converting alkyl ether groups to carbonyl groups, and treating with an alkali metal hydroxide thereby converting carbonyl groups to carboxylate ion groups.

30 Claims, No Drawings

FLUOROVINYL ETHER POLYMERS

TECHNICAL FIELD

This invention relates to fluorovinyl ether polymers, carbonyl-containing and carboxylate ion-containing fluoropolymers derived therefrom, and electrolytic cell diaphragms containing the carboxylate ion-containing fluoropolymers.

BACKGROUND ART

U.S. Pat. No. 3,853,720 to Korach et al. and U.S. Pat. No. 3,853,721 to Darlington disclose copolymers having the general formula

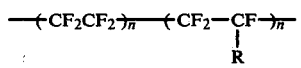

wherein R is selected from a group which includes

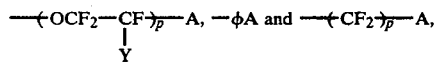

where p is 1–3, Y is —F or a perfluoroalkyl group of 1–10 carbon atoms, $\phi$ is aryl, and A is a group bearing acid functionality selected from: —SO$_3$H, —CF$_2$SO$_3$H, —CCl$_2$SO$_3$H, —$\phi'$SO$_3$H, —PO$_3$H$_2$, —PO$_2$H$_2$, —COOH and $\phi'$OH. The copolymers are used as components of fluorocarbon resin-containing asbestos diaphragms for chlor-alkali electrolysis cells.

In Jour. Am. Chem. Soc., 79, p. 1741–1744 (1957) Koshar et al. disclose the preparation of unsaturated, nonpolymeric fluoroethers by base-catalyzed addition of alkanols to fluorinated olefins, e.g.,

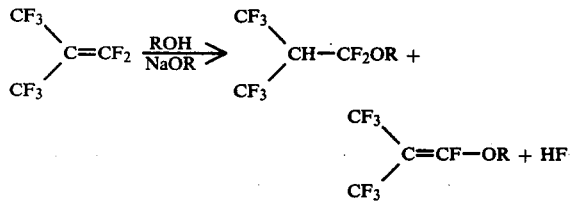

In Jour. Am. Chem. Soc., 78, p. 1685–1686 (1956) Park et al. disclose the preparation of unsaturated, nonpolymeric haloethers by base-catalyzed addition of alkanols to perhalogenated olefins, e.g.,

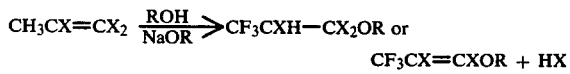

where X is F or Cl.

In Org. Synthesis, 34, pp. 16–18 (1954) Englund discloses that the treatment of non-polymeric halogenated olefins with alcoholic bases leads to saturated ethers, e.g.,

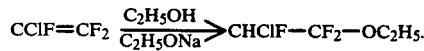

In Jour. Am. Chem. Soc., 72, pp. 1860–1861 (1950) Young et al. disclose that saturated ethers can be prepared by reaction of chlorotetrafluoroethane with sodium ethoxide,

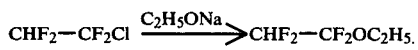

DISCLOSURE OF INVENTION

In accordance with this invention fluorovinyl ether polymers are provided which consist essentially of about 60 to about 99.9 mole percent on monomeric units —CF$_2$CFY— and about 0.1 to about 40 mole percent of the structural units

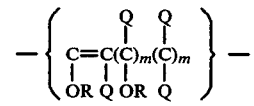

wherein each Y independently is F, H, Cl, Br, R$_f$ or OR$_f$ in which R$_f$ is a perfluoroalkyl of 1–3 carbon atoms, R is an alkyl of 1–8 carbon atoms, each Q independently is F or OR, m is 0 or 1, and which have number average molecular weights in the range of about 1,000 to about 1,000,000.

These fluorovinyl ether polymers can be prepared by contacting a fluoropolymer of the formula (CF$_2$CFY)$_x$ wherein each Y is as specified above provided that about 1 to about 100%, preferably about 3 to about 35%, of the Y's are reactive sites independently selected from the group consisting of H, Cl and Br, and x represents the number of monomer units in the fluoropolymer such that the number average molecular weight is in the range of about 1,000 to about 1,000,000 preferably about 5,000 to about 500,000, with a metal alkoxide of the formula M(OR)$_p$ wherein M is an alkali or alkaline earth metal, R is as specified above, and p is 1 or 2 and is equal to the valence of M, at a temperature of 25° to 200° C. for a time sufficient to obtain the fluorovinyl ether polymer.

It has been further discovered that carboxylate ion-containing fluoropolymers which are useful for preparing electrolytic cell membranes and diaphragms may be prepared by heating the above fluorovinyl ether polymers at a temperature of about 250° to 400° C. for a time sufficient to convert the alkyl ether groups to carbonyl groups and increase the molecular weight by cross-linking, followed by contacting the resulting carbonyl-containing fluoropolymer with an alkali metal hydroxide at about 80 to about 100° C. for a time sufficient to convert the carbonyl groups to carboxylate ion groups.

The fluorovinyl ether polymers of this invention consist essentially of the structural units specified above. It is to be understood that there is no intention to designate the distribution of

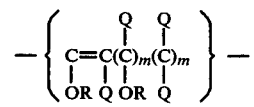

units within the fluorovinyl ether polymer, and that within each such unit Q independently may be F or OR, and m may be 0 or 1. Moreover, there is no intention to designate the arrangement of vinyl and methylene segments within the bracketed units. The brackets {} are used in the above formula to indicate that the order of the enclosed segments is not known. In other words, when m is 1, the order of the segments

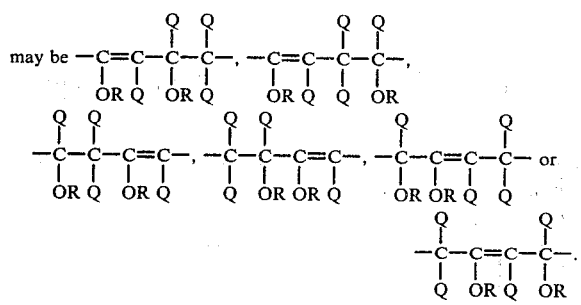

The preferred fluorovinyl ether polymers are those in which each Y individually is F, Cl, Br or $CF_3$; 70 to 98 mole percent of the polymer consists of $-CF_2CFY-$ monomeric units; R is $C_2H_5$, $C_3H_7$ or $C_4H_9$; and the molecular weight is in the range of about 5,000 to about 500,000.

The fluorovinyl ether polymers are prepared from fluoropolymers of the formula $(CF_2-CFY)_x$ in which Y and x are as defined above and about 1 to about 100 mole percent of the monomer units, preferably about 3 to about 35 mole percent, have the structure $-CF_2-CFX-$ in which X is a reactive site selected from the group consisting of H, Cl or Br. The fluoropolymer may be a homopolymer of a monomer containing a reactive site, or it may contain one or more perfluorinated comonomers not containing reactive sites which provide polymer segments which are resistant to thermal decomposition at the temperatures of at least about 250° C. used in the carbonylation step and to reaction with the alkali hydroxide used in the carboxylation step. Preferably the perfluorinated comonomer yields polymer segments which are also stable for extended periods toward the strong bases encountered in chloralkali cells.

Examples of suitable comonomers not containing reactive sites include tetrafluoroethylene, hexafluoropropylene, perfluoropropyl vinyl ether and perfluoromethyl vinyl ether. Suitable comonomers containing reactive sites are trifluoroethylene, chlorotrifluoroethylene and bromotrifluoroethylene. The perfluorinated comonomers and the fluorinated monomers containing reactive sites described above are commercially available or readily prepared by known techniques. General methods of preparing fluoroolefin monomers are reviewed by M. Hudlicky in Chapter 5 of "Chemistry of Organic Fluorine Compounds," MacMillan (1962).

The starting fluoropolymers are readily prepared by conventional polymerization techniques, for example, using free radical initiators such as perfluoropropionyl peroxide in an inert solvent such as trichlorotrifluoroethylene, or by emulsion polymerization in water, commonly initiated with potassium persulfate.

The starting fluoropolymers are converted to the fluorovinyl ether polymers of this invention by reaction with a metal alkoxide according to the equation:

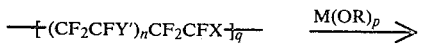 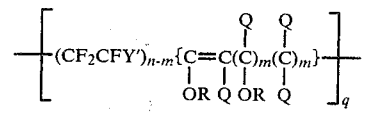

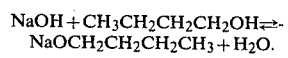

where X, M, R, Q, n, m, and p are as defined above, each Y' independently is F, $R_f$ or $OR_f$ where $R_f$ is as defined above, and q represents the number of repeat units in the polymer such that the number average molecular weight of the polymer is in the range of 1,000 to 1,000,000. M is preferably an alkali metal, particularly Na or K. Reactant ratios may vary over wide limits, but generally there should be from about 2 to about 25 moles of alkoxide for each equivalent of monomer containing a reactive site.

The process is carried out in a suitable polar medium such as alcohols ROH (where R is $C_1$-$C_8$ hydrocarbon), glyme, diglyme, triglyme, tetrahydrofuran, dimethylacetamide, or hexamethylphosphoramide. The reaction is most conveniently out at atmospheric pressure, but may be conducted under pressure, if necessary, to attain the desired temperature. If desired, inert cosolvents such as o-xylene or other aromatics may be added to enhance penetration of the base into the fluoropolymer. Since the presence of a small amount of water can be tolerated, the metal alkoxide can be formed, if desired, from a mixture of metal hydroxide and a large excess of alcohol, e.g.:

$$NaOH + CH_3CH_2CH_2CH_2OH \rightleftharpoons NaOCH_2CH_2CH_2CH_3 + H_2O.$$

The concentration of total reactants in the polar medium is not critical and may be varied over wide limits, but about 5 to about 20% by weight is convenient. Agitation is desirable to facilitate reaction, since both the starting polymer and polymeric fluorovinyl ether product are insoluble or, at best partially swollen with solvent.

The reaction is carried out at a temperature of about 25 to about 200° C. for a time sufficient to obtain the desired fluorovinyl ether polymer. The reaction is preferably carried out for a period of about 1 hour to about 3 days at a temperature of about 70 to about 150° C. After the reaction is complete the product is readily isolated by filtration and can be freed of by-product salts by extraction with water.

The fluorovinyl ether polymers of this invention are converted to the carbonyl-containing fluoropolymers of this invention by heating the ether polymer at a temperature of about 250° to about 400° C. for a time sufficient to convert the alkyl ether groups (COR) to carbonyl groups (C=O) and increase the molecular weight by crosslinking. Preferably the ether polymer is heated for about 10 minutes to about 2 hours at a temperature of about 300° to about 360° C.

The resulting carbonyl-containing polymers are converted to the carboxylate ion-containing fluoropolymers of this invention by contacting the polymer with an alkali metal hydroxide, typically an aqueous sodium hydroxide solution at about 50° to about 125° C. for a time sufficient to convert the carbonyl groups to carboxylate ions. Preferably the carbonyl-containing polymer is heated at about 80° to about 100° C. for about 8 hours to about 10 days, and most preferably for about 1 to about 7 days. The molecular weight of the polymer is generally reduced during this step.

The carboxylate ion-containing fluoropolymers may be converted to the carboxylic acid-containing fluoropolymers of this invention by contacting the polymer with an excess of a mineral acid, such as an aqueous hydrochloric acid solution at about 80° to about 125° C. for a time sufficient to convert the carboxylate ion groups to carboxylic acid groups. Preferably, the carboxylate ion-containing polymer is heated at about 80° to about 100° C. for about 2 to about 5 hours. The carboxylic acid-containing fluoropolymers are water-wettable and may, if desired, be neutralized to carboxylate ion-containing polymers useful as ion-exchange materials.

The carboxylic acid and carboxylate ion-containing fluoropolymers of this invention are useful as adhesion-promoting components of fluoropolymer compositions to improve adhesion of fluoropolymers to mineral fillers or reinforcing materials contained therein, and to improve adhesion of said fluoropolymer composites to surfaces such as metals, metal oxides, carbon and the like.

The carboxylate ion-containing fluoropolymers of this invention are also useful in preparing electrolytic cell membranes or as components of compositions used to prepare electrolytic cell diaphragms, said membranes and diaphragms being electrically conductive in electrolytic cell media. The compositions of this invention contain, by weight, (a) about 5 to about 19%, preferably about 15 to about 25%, of organic fluoropolymer composed of
  (1) about 10 to about 100%, preferably about 40 to about 60%, of the carboxylate ion-containing fluoropolymer and,
  (2) optionally, 0 to about 90%, preferably about 40 to about 60%, of a fluoropolymer binder, and
(b) about 10 to about 95%, preferably about 75 to about 85%, of fibrous material.

Any fibrous material can be used which is thermally stable at the melt flow temperature of the fluoropolymer components and which resists attack by the environment in which the structure is to be used. Illustrative examples of suitable materials include asbestos, glass fibers, fibers of fluoropolymers such as poly(tetrafluoroethylene), and potassium titanate fibers. Mixtures of such fibrous materials can also be used. Preferably the fibrous material can withstand the baking temperature used in the carbonylation step and is resistant to the alkali hydroxide used in the carboxylation step. Most preferably the fibrous material is also resistant to the strong alkali encountered in chlor-alkali cells. Asbestos is the preferred fibrous material for use in electrolytic cell diaphragms. Especially preferred is a chrysotile asbestos whose fibers have an average diameter of about 200 Å (as measured by electron microscopy) and an average length of about 70 mm.

Similarly, any fluoropolymer which resists attack by the environment in which the structure is to be used can be used as the binder. Preferably the fluoropolymer used as a binder material is resistant to decomposition at the temperature of at least 250° C. used in the carbonylation step and to the alkali hydroxide used in the carboxylation step. Most preferably the fluoropolymer binder is also unreactive toward the strong bases encountered in chlor-alkali cells. Illustrative examples of suitable binders include polytetrafluoroethylene, tetrafluoroethylene/hexafluoropropylene copolymers (all monomer ratios), and tetrafluoroethylene/perfluoropropyl vinyl ether copolymers. Mixtures of binder materials can also be used. In electrolytic cell diaphragms, the tetrafluoroethylene/hexafluoropropylene copolymers are preferred as binder materials because of their inert nature.

The compositions of this invention which are electrically conductive in electrolytic cell media can be prepared by mixing the fibrous material directly with the fluorovinyl ether polymer and subjecting the resulting composition to the heating and carboxylation steps required to convert the fluorovinyl ether polymer to the carboxylate ion-containing fluoropolymer. The initial mixing is done by preparing a dispersion containing (1) 0.01 to 3% of dispersed components which comprise, by weight
  (a) 5 to 90% of fluoropolymer composed of
    (1) 10 to 100% of the fluorovinyl ether polymer and
    (2) 0 to 90% of fluoropolymer binder, and
  (b) 10 to 95% of fibrous material which is thermally stable at the melt flow temperature of the fluoropolymer components, and
(2) 97 to 99.99% of a liquid carrier.

This dispersion can also contain conventional adjuncts such as wetting agents, surfactants, defoamers and the like, in the usual amounts.

Suitable liquid carriers for preparing these dispersions include any liquid which will not significantly affect the chemical or physical characteristics of the structure. Illustrative of such liquids are water, methanol, chlorinated hydrocarbons, hexane and brine. When the composite is to be used to make an electrolytic cell diaphragm, a 15% by weight brine solution is preferred as a carrier because it helps keep the fibrous material in suspension.

The carboxylate ion-containing fluoropolymer compositions of this invention are particularly useful as components in composite diaphragms for chlor-alkali electrolysis cells. Such diaphragms are made from the above dispersions by first deagglomerating the fibers of (b) above and then forming a mat of the fibers by removing the carrier, preferably by a papermaking technique. In a highly preferred embodiment of the invention, this porous reinforced structure is formed directly on the cathode screen of an electrolytic cell.

A preferred embodiment of this invention is a composition in the form of an electrolysis cell diaphragm which, having originally contained 5–15% by weight of a fluorovinyl ether polymer, has been rendered electrically conductive in electrolytic cell media by baking at about 300° to about 360° C., followed by immersion in aqueous alkali at about 80° to about 100° C.

BEST MODE

The following examples illustrate the invention, and include the best mode contemplated for carrying out the invention. In these examples, all percentages and parts are by weight, and all temperatures are in degrees Celcius.

EXAMPLE 1

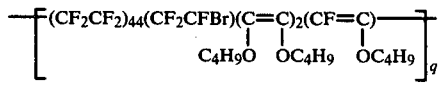

A solution of sodium n-butoxide in n-butanol was prepared by dissolving 9.2 g (0.40 mol) of sodium in 500 ml of n-butanol. Then, 50.0 g (0.04 equiv.) of an 11:1 copolymer of $CF_2=CF_2$ and $CF_2=CFBr$ was added, and the suspension was stirred and refluxed for two days. The reaction mixture was cooled and filtered, and the filter cake was rinsed with ethanol, and stirred successively with 500 ml of water, 600 ml of a 1:1 ethanol/water mixture, 500 ml of a 10:1 water/ethanol mixture, and then 500 ml of water. The product after being dried under vacuum weighed 48.1 g.

Anal. Calcd. for $C_{116}H_{45}BrF_{180}O_5$: C, 27.76; H, 0.90; Br, 1.59. Found: C, 27.69, 28.02; H, 1.00, 1.02; Br, 1.48.

The analysis corresponds to the above formula and represents the removal of 4.9% of Br (77% of available Br) from the starting copolymer.

IR (KBr wafer): 3.38 (satd. CH), 6.0 (broad weak C=C) 8–9$\mu$ (strong C—F bands).

EXAMPLE 2

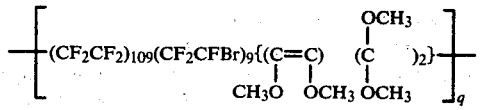

To a solution of 8.0 g (0.20 mol) of sodium hydroxide in 250 ml of methanol was added 32.5 g (0.025 equiv.) of a 11:1 copolymer of $CF_2=CF_2$ and $CF_2=CFBr$. The suspension was stirred and refluxed (67°–68° C.) for one day with exclusion of moisture. Solid product was filtered off, then washed free of water-soluble materials by thorough stirring with 2×500 ml of water. The filtered polymer weighed 30.5 g after drying under vacuum.

Anal. Calcd. for $C_{246}H_{18}Br_9F_{463}O_6$: C, 23.48; H, 0.14; Br, 5.72. Found: C, 23.63; H, 0.25; Br, 5.86.

The analysis corresponds to the above formula and indicates a loss of 0.6% of bromine (9.5% of available Br) with the introduction of about four methoxy units for each Br removed. The presence of C=C unsaturation was indicated by treatment of a sample suspended in water at 25° with chlorine until no more chlorine was absorbed. The filtered and dried product contained 0.5% Cl by analysis.

EXAMPLE 3

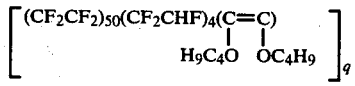

To a solution of 20.0 g (0.50 mol) of sodium hydroxide in 250 ml of n-butanol was added 42.4 g (0.039 equiv.) of a 10:1 copolymer of $CF_2=CF_2$ and $CF_2=CFH$. The suspension was stirred and heated at 115°–120° C. for two days. The solid product was filtered, washed with distilled water until neutral (3×300 ml), and dried under vacuum. The dried product weighed 39.9 g.

Anal. Calcd. for $C_{118}H_{22}F_{212}O_2$: C, 25.77; H, 0.40; F, 73.24 Found: C, 24.99; H, 0.46; C, 24.93; H, 0.43. F, 72.60. F, 72.85.

The analysis corresponds to the above formula with about 20% reaction at —CH— sites.

EXAMPLE 4

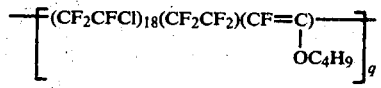

50.0 g (0.432 equiv.) of poly(chlorotrifluoroethylene) was added to a solution of 4.6 g (0.20 mol) of sodium in 500 ml of n-butanol. The suspension was stirred and refluxed under nitrogen for one day. Solid product was filtered, rinsed with ethanol and extracted successively with 500 ml water, 500 ml of a 1:1 water/ethanol mixture, 500 ml of a 10:1 water/ethanol mixture and 500 ml of water, and dried under vacuum. Yield: 50.4 g.

Anal. Calcd. for $C_{44}H_9Cl_{18}F_{59}O$: C, 22.85; H, 0.30; Cl, 27.60. Found: C, 22.57; H, 0.76; C, 22.48; H, 0.49; Cl, 27.46; Cl, 27.49.

The analysis corresponds to the above formula with the removal of 2.9% of chlorine (8.5% of available Cl).

IR (KBr wafer): 3.37 (satd. CH), 6.0 (C=C)

EXAMPLE 5

A fluorocarbon terpolymer was prepared as follows:

A 400-ml conditioned steel tube was charged with 200 ml of oxygen-free distilled water in which were dissolved 0.13 g of perfluorooctanoic acid, 1 ml of 10% aqueous NaOH, and 0.60 g of potassium persulfate. The tube was cooled, evacuated and then charged with 6 g (0.037 mole) of $CF_2=CFBr$, 15 g (0.10 mol) of $CF_3CF=CF_2$, and 50 g (0.50 mol) of $CF_2=CF_2$. Agitation at 80° for four hours resulted in a pressure drop from 660 to 270 psig. The temperature was raised to 100° C. for two hours (final pressure 210 psig), then the tube was cooled, vented and product collected. Filtration, washing of the solid with water and then methanol, and drying under vacuum gave 44.2 g of colorless polymer. Found for Br: 5.47, 5.57%.

A 23.0 g (0.016 mol) portion of the above terpolymer was added to a solution of 4.6 g (0.20 mol) of sodium in 250 ml of n-butanol. The suspension was stirred and refluxed under nitrogen for 23 hours. Solid product was filtered, rinsed with 200 ml of 95% ethanol, then extracted with 3×200 ml water and dried under vacuum. Yield: 23.5 g.

Anal. Found: Br 1.43, 1.45; 4.1% Br removed (74.5% of available Br).

EXAMPLE 6

An 11:1 copolymer (6.3% Br) of $CF_2=CF_2$ and $CF_2=CFBr$ was converted to a n-butyl ether copolymer containing

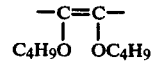

segments by the procedure in Example 1. A sample of the resulting copolymer was placed in the pan of a Wallace-Shawburg Curometer (Mark VI) preheated to 270° C. After initial bubbling had subsided and the mass was nearly all molten, the detector wand was positioned and the cover closed. Continuous readings taken at 270° C. showed a detectable increase in viscosity after 20 minutes. Viscosity increased more rapidly, then leveled during about 3 hrs.

The recovered polymer was cross-linked, as indicated by its hardness and intractability. IR analysis shows that a substantial portion of the butoxy ($C_4H_9O-$) groups are converted to carbonyl ($>C=O$) functions with the elimination of butene-1:

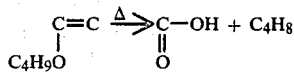

EXAMPLE 7

A 9-g sample of the unsaturated fluorovinyl ether polymer of Example 1 and 5.5 g of a copolymer of tetrafluoroethylene and hexafluoropropylene were dispersed in a mixture of 50 cc of methanol, 1 g of Triton ® X-100 surfactant and 50 cc of water. The dispersion was added to a slurry of 40 g of asbestos fiber and 24.3 g of sodium chloride in 3 l of distilled water. The total slurry was sparged with nitrogen and agitated until uniform (approx. 2 hours), then filtered to obtain a composite mat. A 4×4 inch section of mat was baked overnight at 90° C., then for 40 minutes at 350° C., cooled and immersed in aqueous alkali at a pH of >10 and a temperature of 80°–100° C. for 1–7 days, then installed as the diaphragm in a chlor-alkali electrolysis cell and tested. The composite was determined to be comparatively hydrophilic and electrically conductive (see Utility Example, Table), confirming the development of ionic functionality in the reactive fluorovinylether polymer component.

INDUSTRIAL APPLICABILITY

The carboxylic acid and carboxylate ion-containing polymers of this invention are useful as adhesion-promoting components in fluoropolymer compositions used in chemically-resistant adhesive or coating formulations. The carboxylate ion-containing polymers of this invention are useful as films or membranes for chlor-alkali electrolysis cells, and are especially useful as components in composite diaphragms for chlor-alkali electrolysis cells. The carboxylate functional fluoropolymers are stable under cell conditions which include alkali concentrations of up to 35%, and lead to low power consumption because of their hydrophilic and electrically conductive character. The resulting diaphragms typically result in cell voltages in the range of 2.9 to 3.8 volts at 1820 amps/m², which are highly desirable in commercial operations. The following example illustrates such utility.

Utility Example A

4×4 inch composite mats containing the unsaturated fluorovinyl ether polymers of Examples 1–6 were prepared as illustrated in Example 7 and used as diaphragms in chlor-alkali electrolysis test cells. The cells were operated for varying periods with the results summarized in the Table. The composites were stable under cell conditions and resulted in operation at low power consumption because of their electrically conductive and hydrophilic properties. In each case, cell voltages of 2.9–3.8 volts were obtained, in striking contrast to a composite diaphragm consisting only of tetrafluoroethylene/hexafluoropropylene copolymer resin and asbestos fiber, which gave a voltage of about 15.

| Fluoropolymer, Example | Cell Voltage | Cell Amperage $10^3$ amps/m² | Current Efficiency (%) | Cell Operation Time (Days) |
|---|---|---|---|---|
| 1 | 3.07–3.17 | 1.82 | 95.1 | 14 |
| 2 | 3.18–3.41 | 2.03 | 97.0 | 4 |
| 3 | 2.85–3.46 | 1.29 | 92.0 | 4 |
| 4 | 3.64–3.78 | 1.82 | 90.5 | 2 |
| 5 | 3.12–3.13 | 1.82 | 96.9 | 11 |
| 6 | 3.30–3.35 | 1.82 | 94.0 | 4 |

Utility Example B

This example illustrates the preparation of a stable, flexible film from a fluorovinyl ether polymer.

A small sample of the fluorovinyl ether polymer of Example 4 was pressed into a 2-mil film by heating at 200° C. for 1 min. between Kapton ® sheets under 500 psi. The flexible film exhibited absorption bands in the IR at 3.4 (saturated C—H) and 6.0μ (broad, C=C) with no indication of carbonyl at 5.6μ. The film, after heating, showed no signs of deterioration, indicating adequate stability for many industrial film and plastic applications.

Utility Example C (A) This example illustrates the preparation of a film from the carbonyl-containing polymer prepared from a fluorovinyl ether polymer.

A 4.75-g sample of the fluorovinyl ether polymer of Example 4 was heated in air at 300°–305° C. for 2 hr. The recovered dark, hard polymer, 4.25 g, was formed into a coherent film 4 inches in diameter and 4 mils thick by pressing it at 220° for 1 min. between Kapton ® sheets under 20,000 psi. The infrared spectrum of this film showed greatly reduced absorption at 3.4 and 6.0μ and strong absorption at 5.6μ with an additional band at 5.7μ, showing nearly all the butoxyvinyl groups had been converted to carbonyl groups.

(B) This example illustrates the conversion of a carbonyl-containing polymer film to a carboxylate ion-containing film.

A sample of the above carbonyl-containing film was heated for 3 hr, on a steam bath in a mixture of 20 g of KOH, 42 ml of dimethyl sulfoxide, and 90 ml of water. The polymer film was then rinsed with distilled water, heated for 30 min. in 100 ml of distilled water, rinsed with water once more and dried under vacuum. The IR spectrum of the neat film contained bands at 2.9 (strong, broad OH), 3.4 (weak saturated C—H), and 6.0μ (strong broad absorption, $-CO_2^\ominus$), with the 5.6–5.7μ absorption essentially gone. The equivalent weight of carboxylate group in the film was determined by titration to be 2,840.

(C) This example illustrates the conversion of a carboxylate ion-containing polymer film to a carboxylic acid-containing polymer film.

A sample of the above film containing potassium carboxylate groups was heated on the steam bath in an excess of 10 N HCl for 3 hr. The film was extracted well with distilled water and dried under vacuum. IR spectrum showed the presence of free carboxylic acid groups (broad 2.9–3.5 and 5.6–5.85μ absorption) with the 6.0–6.2μ absorption markedly reduced.

We claim:

1. A fluorovinyl ether polymer consisting essentially of 60 to 99.9 mole percent of monomeric units $-CF_2-$ CFY— and 0.1 to 40 mole percent of the structural units

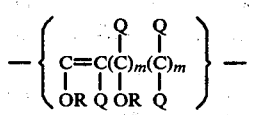

wherein
each Y independently is F, H, Cl, Br, $R_f$ or $OR_f$ in which $R_f$ is a perfluoroalkyl of 1–3 carbon atoms, R is an alkyl of 1–8 carbon atoms, each Q independently is F or OR, and m is 0 or 1,
and having a number average molecular weight in the range of 1,000 to 1,000,000.

2. The fluorovinyl ether polymer of claim 1 consisting essentially of 70 to 98 mole percent of —CF$_3$CFY— units and 2 to 30 mole percent of

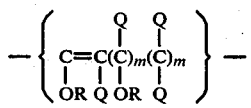

units wherein each Y independently is F, Cl, Br or CF$_3$, each Q independently is F or OR, m is 0 or 1, R is C$_2$H$_5$, C$_3$H$_7$ or C$_4$H$_9$ and the number average molecular weight is in the range of 5,000 to 500,000.

3. The method of preparing fluorovinyl ether polymer of claim 1 which comprises contacting a fluoropolymer of the formula (CF$_2$CFY)$_x$ wherein each Y independently is F, H, Cl, Br, $R_f$ or $OR_f$ in which $R_f$ is a perfluoroalkyl of 1–3 carbon atoms, provided that 1 to 100% of the Y's are reactive sites, each independently selected from the group consisting of H, Cl and Br, and x represents the number of monomer units in the fluoropolymer such that the number average molecular weight of the fluoropolymer is in the range of 1,000 to 1,000,000, with a metal alkoxide of the formula M(OR)$_p$ wherein M is an alkali or alkaline earth metal, R is an alkyl of 1–8 carbon atoms, and p is 1 or 2 and is equal to the valence of M, at a temperature of 25° to 200° C. for a time sufficient to provide the fluorovinyl ether polymer.

4. The method of claim 3 in which the number average molecular weight of the fluoropolymer is in the range of 5,000 to 500,000, and in which 3 to 35% of the Y's are reactive sites, the fluoropolymer is contacted with 2 to 25 moles of metal alkoxide per equivalent of reactive site in the fluoropolymer, M is an alkali metal, and R is C$_2$H$_5$, C$_3$H$_7$ or C$_4$H$_9$.

5. The carbonyl-containing fluoropolymer obtained by heating a fluorovinyl ether polymer of claim 1 at a temperature of 250° to 400° C. for a time sufficient to convert the alkyl ether groups to carbonyl groups and increase the molecular weight by cross-linking.

6. The carbonyl-containing fluoropolymer obtained by heating a fluorovinyl ether polymer of claim 2, at a temperature of 300° to 360° C., for 10 minutes to 2 hours.

7. The method of preparing a carbonyl-containing fluoropolymer of claim 5 which comprises heating a fluorovinyl ether polymer consisting essentially of 60 to 99.9 mole percent of monomeric units —CF$_2$CFY— and 0.1 to 40 mole percent of the structural units

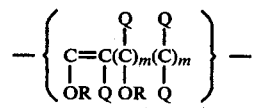

wherein
each Y independently is F, H, Cl, Br, $R_f$ or $OR_f$ in which $R_f$ is a perfluoroalkyl of 1–3 carbon atoms, R is an alkyl of 1–8 carbon atoms, each Q independently is F or OR, and m is 0 or 1,
and having a number average molecular weight in the range of 1,000 to 1,000,000,
at a temperature of 250° to 400° C. for a time sufficient to convert the alkyl ether groups to carbonyl groups and increase the molecular weight by cross-linking.

8. The method of claim 7 in which the fluorovinyl ether polymer consists essentially of 70 to 98 mole percent of —CF$_3$CFY— units and 2 to 30 mole percent of

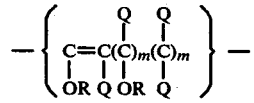

units wherein each Y independently is F, Cl, Br or CF$_3$, each Q independently is F or OR, m is 0 or 1, R is C$_2$H$_5$, C$_3$H$_7$ or C$_4$H$_9$ and the number average molecular weight is in the range of 5000 to 500,000;
the temperature is 300° to 360° C., and the time is 10 minutes to 2 hours.

9. The carboxylate ion-containing fluoropolymer obtained by contacting the carbonyl-containing fluoropolymer of claim 5 with an alkali metal hydroxide at 50 to 125° C. for a time sufficient to convert the carbonyl groups to carboxylate ion groups.

10. The carboxylate ion-containing fluoropolymer obtained by contacting the carbonyl-containing fluoropolymer of claim 6, with an alkali metal hydroxide at a temperature of 80° to 100° C., and a time of 8 hours to 3 days.

11. The method of preparing a carboxylate ion-containing fluoropolymer which comprises contacting a carbonyl-containing fluoropolymer of claim 5 with an alkali metal hydroxide at 50° to 125° C. for a time sufficient to convert the carbonyl groups to carboxylate ion groups.

12. The method of preparing a carboxylate ion-containing fluoropolymer which comprises contacting a carbonyl-containing fluoropolymer of claim 6, with an alkali metal hydroxide at a temperature of 80° to 125° C., and a time of 2 hours to 3 days.

13. The carboxylic acid-containing fluoropolymer obtained by contacting the carboxylate ion-containing fluoropolymer of claim 9 with excess mineral acid at 80° to 125° for a time sufficient to convert the carboxylate ion groups to carboxylic acid groups.

14. The carboxylic acid containing fluoropolymer obtained by contacting the carboxylate ion-containing fluoropolymer of claim 10 with excess mineral acid at a temperature of 80 to 100° C., and a time of 2 to 5 hours.

15. The method of preparing a carboxylic acid-containing fluoropolymer which comprises contacting a carboxylate ion-containing fluoropolymer of claim 9 with excess mineral acid at 80° to 125° C. for a time sufficient to convert the carboxylate ion groups to carboxylic acid groups.

16. The method of preparing a carboxylic acid-containing fluoropolymer which comprises contacting a carboxylate ion-containing fluoropolymer of claim 10 with excess mineral acid at a temperature of 80° to 100° C. and a time of 2 to 5 hours.

17. Dispersions which comprise, by weight
   (1) 0.01 to 3% of dispersed components which comprise
      (a) 5 to 90% of fluoropolymer composed of
         (1) 10 to 100% of the fluorovinyl ether polymer of claim 1, and
         (2) 0 to 90% of fluoropolymer binder, and
      (b) 10 to 95% of fibrous material which is thermally stable at the melt flow temperature of the fluoropolymer components, and
   (2) 97 to 99.99% of a carrier liquid.

18. The dispersions in which the dispersed components comprise
   (1) 0.01 to 3% of dispersed components which comprise
      (a) 15 to 25% of fluoropolymer composed of
         (1) 40 to 60% of the fluorovinyl ether polymer of claim 2, and
         (2) 40 to 60% of fluoropolymer binder, and
      (b) 75 to 85% of asbestos, and
   (2) 97 to 99.99% of a carrier liquid.

19. The dispersion of claim 18 in which the fluoropolymer binder is a tetrafluoroethylene/hexafluoropropylene copolymer.

20. The composition which comprises, by weight,
   (a) 5 to 90% of fluoropolymer composed of
      (1) 10 to 100% of the carboxylate ion-containing fluoropolymer of claim 9, and
      (2) 0 to 90% of fluoropolymer binder, and
   (b) 10 to 95% of fibrous material which is thermally stable at the melt flow temperature of the fluoropolymer components.

21. The composition which comprise, by weight,
   (a) 5 to 90% of fluoropolymer composed of
      (1) 10 to 100% of the carboxylate ion-containing fluoropolymer of claim 9, and
      (2) 0 to 90% of fluoropolymer binder, and
   (b) 10 to 95% of fibrous material which is thermally stable at the melt flow temperature of the fluoropolymer components, and which are electrically conductive in electrolyte media.

22. The composition which comprises, by weight,
   (a) 15 to 25% of fluoropolymer composed of
      (1) 40 to 60% of the carboxylate ion-containing fluoropolymer of claim 10, and
      (2) 40 to 60% of fluoropolymer binder, and
   (b) 75 to 85% of asbestos.

23. The compositions of claim 22 in which the fluoropolymer binder is a tetrafluoroethylene/hexafluoropropylene copolymer.

24. An electrolytic cell diaphragm composed of the composition of claim 21.

25. An electrolytic cell diaphragm composed of the composition of claim 22.

26. An electrolytic cell diaphragm composed of the composition of claim 23.

27. The method of preparing an electrolytic cell diaphragm which comprises
   (1) forming a composition which comprises, by weight
      (a) 5 to 90% of fluoropolymer composed of
         (1) 10 to 100% of the fluorovinyl ether polymer of claim 1, and
         (2) 0 to 90% of fluoropolymer binder, and
      (b) 10 to 95% of fibrous material which is thermally stable at the melt flow temperature of the fluoropolymer components into the shape of an electrolytic cell diaphragm,
   (2) heating the composition at a temperature of 250 to 400° C. for a time sufficient to convert the alkyl ether groups to carbonyl groups and increase the molecular weight by cross-linking, and
   (3) contacting the resulting composition with an alkali metal hydroxide at 50° to 125° C. for a time sufficient to convert the carbonyl groups to carboxylate ion groups.

28. The method of claim 27 in which the composition comprises
   (1) 15 to 25% of fluoropolymer composed of
      (a) 40 to 60% of fluorovinyl ether polymer, and
      (b) 40 to 60% of fluoropolymer binder, and
   (2) 75 to 85% of asbestos.

29. The method of claim 28 in which the fluoropolymer binder is a tetrafluoroethylene/hexafluoropropylene copolymer.

30. The composition which comprises, by weight,
   (a) 5 to 90% of fluoropolymer composed of
      (1) 10 to 100% of the carboxylic acid-containing fluoropolymer of claim 13, and
      (2) 0 to 90% of fluoropolymer binder, and
   (b) 10 to 95% of fibrous material which is thermally stable at the melt flow temperature of the fluoropolymer components.

* * * * *